STATOR WINDING MACHINE

Filed Oct. 3, 1963 10 Sheets-Sheet 1

May 31, 1966 R. E. MOREY ET AL 3,253,793

STATOR WINDING MACHINE

Filed Oct. 3, 1963 10 Sheets-Sheet 2

May 31, 1966 R. E. MOREY ET AL 3,253,793

STATOR WINDING MACHINE

Filed Oct. 3, 1963 10 Sheets-Sheet 3

| | | START | CYCLE HAS STARTED | WIND | | | WIND IS COMPLETE | CENTER | BRAKE OFF | CENTER IS COMPLETE | OSC ADVANCE TO #2 | OSC ADVANCE TO #3 | OSC ADVANCE TO #1 | OSCILLATION IN #1 | OSCILLATION IN #2 | OSCILLATION IN #3 | CONTROLLER HOME LIGHT | INDEX | INDEX COMPLETE | SC RESET |
|---|---|---|---|---|---|---|---|---|---|---|---|---|---|---|---|---|---|---|---|---|
| CONTACT NUMBER | | 1 | 2 | 3 | 4 | 5 | 6 | 7 | 8 | 9 | 10 | 11 | 12 | 13 | 14 | 15 | 16 | 17 | 18 | 19 |
| DIAGRAM LINE | | 6 | 28 | 18 | 19 | 20 | 26 | 40 | 55 | 29 | 34 | 36 | 15 | 29 | 30 | 31 | 3 | 41 | 27 | 32 |
| CONTROLLER POSITION | | | | | | | | | | | | | | | | | | | | |
| 1 | START | O | O | | | | | | | | | | | | | | O | | | |
| 2 | WIND #1 | | | O | | | O | | | | | | | | | | | | | O |
| 3 | CENTER OSC #2 | | | | | | | O | O | O | O | | | | O | | | | | O |
| 4 | WIND #2 | | | O | | | O | | | | | | | | | | | | | O |
| 5 | CENTER OSC #3 | | | | | | | O | O | O | | O | | | | O | | | | O |
| 6 | WIND #3 | | | O | | | O | | | | | | | | | | | | | O |
| 7 | CENTER OSC #1 | | | | | | | O | O | O | | | O | O | | | | | | O |
| 8 | INDEX | | | | | | | | | | | | | | | | | O | O | O |
| 9 | WIND #1 | | | O | | | O | | | | | | | | | | | | | O |
| 10 | CENTER OSC #2 | | | | | | | O | O | O | O | | | | O | | | | | O |
| 11 | WIND #2 | | | O | | | O | | | | | | | | | | | | | O |
| 12 | CENTER OSC #3 | | | | | | | O | O | O | | O | | | | O | | | | O |
| 13 | WIND #3 | | | O | | | O | | | | | | | | | | | | | O |
| 14 | CENTER OSC #1 | | | | | | | O | O | O | | | O | O | | | | | | O |
| 15 | INDEX | | | | | | | | | | | | | | | | | O | O | O |
| 16 | RESET | | | | | | | | | | | | | | | | | | O | O |

Fig. 12.

May 31, 1966 R. E. MOREY ET AL 3,253,793

STATOR WINDING MACHINE

Filed Oct. 3, 1963 10 Sheets-Sheet 9

May 31, 1966 R. E. MOREY ET AL 3,253,793

STATOR WINDING MACHINE

Filed Oct. 3, 1963 10 Sheets-Sheet 10

United States Patent Office 3,253,793

Patented May 31, 1966

3,253,793

STATOR WINDING MACHINE

Robert E. Morey, Russell's Point, and Earl E. Hefner, Lima, Ohio, assignors to Westinghouse Electric Corporation, East Pittsburgh, Pa., a corporation of Pennsylvania Filed Oct. 3, 1963, Ser. No. 313,573
5 Claims. (Cl. 242—1.1)

This invention relates, generally, to winding machines and, more particularly, to machines for winding electrical coils in the stators of dynamoelectric machines, for example alternating current motors.

Higher slot fill factors in A.C. induction motors and high rates of production of these motors have made it desirable to develop high speed automatic winding machines capable of inserting wire in the stator slots in a uniform and consistent pattern with effective utilization of available slot area. In general, maximum slot fill can be obtained by inserting the wire with a motion pattern which closely approaches the form of the finished wound coils and retaining the wire in this form. One of the methods frequently used to accomplish this result is to utilize a winding machine having a combination of needle and flopper or shuttle motions which place the wire in the slot and around retaining fingers removably attached to the stator core. Prior winding machines of this kind either have been slow in operation or have had winding motions which deviate from the preferred motion pattern. Heretofore, the needles and floopers or shuttles on winding machines have been operated entirely by mechanical linkages and motions or entirely by hydraulically controlled motions. In the case of hydraulic operation the motion has been slow and inconsistent. With mechanical linkages the motion has been compromised and changed from the desired pattern because of mechanical complications.

An object of this invention is to increase the speed of operation of a winding machine having a winding head for inserting wires into slots in a generally cylindrical core.

Another object of the invention is to improve the motion pattern of a machine for winding motor stator coils.

A further object of the invention is to provide a winding machine having a small amount of vibration when operating at a relatively high speed.

Still another object of the invention is to provide a machine which can be readily adjusted to wind coils for motors of different sizes.

A still further object of the invention is to provide a winding machine having a combination of mechanical and hydraulic components which cooperate to achieve the desired winding action.

Other objects of the invention will be explained fully hereinafter or will be apparent to those skilled in the art.

In accordance with one embodiment of the invention a winding machine for inserting wire into slots in a stator core is provided with a winding head attached to one end of a needle. The needle is reciprocated axially of the core by a sliding crosshead driven by a lever actuated by a first cam. The needle is rotated or oscillated about its axis by a gear driven by a rack actuated by a lever operated by a second cam. A third cam actuates a piston in a master cylinder connected by a closed hydraulic system to a slave cylinder containing a piston for operating a wire guiding flopper in and out over a nozzle in the winding head through which the wire is fed. The three cams are driven in synchronism by a motor. Since the reciprocating motion of the needle, the oscillating motion of the needle and the stroke or throw of the flopper are controlled by independent cams, any desired motion pattern of these members can be obtained by constructing each cam to impart the necessary movement to its respective member. The parts which actuate the flooper are light in weight, therefore they can be operated at high speed to increase the winding speed of the machine. Furthermore, the system is flexible, as the reciprocating stroke of the needle, the degree of oscillation of the needle and the throw of the flopper can each be changed without affecting the operation of the other members of the system.

For a better understanding of the nature and objects of the invention, reference may be had to the following detailed description, taken in conjunction with the accompanying drawings, in which:

FIG. 12 is a program chart showing the sequence of the winding operations;

Figure 13A:
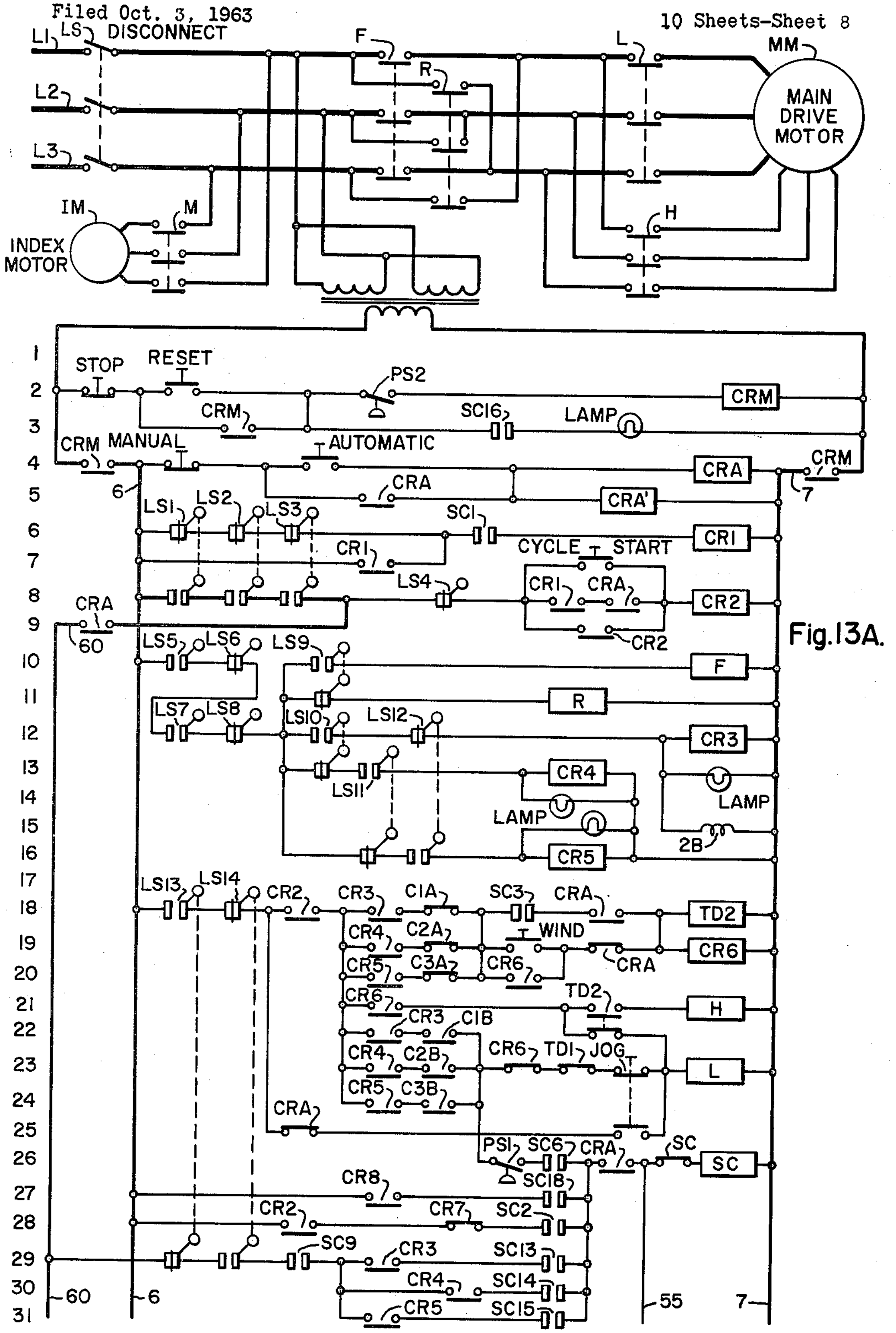
Figure 13B:
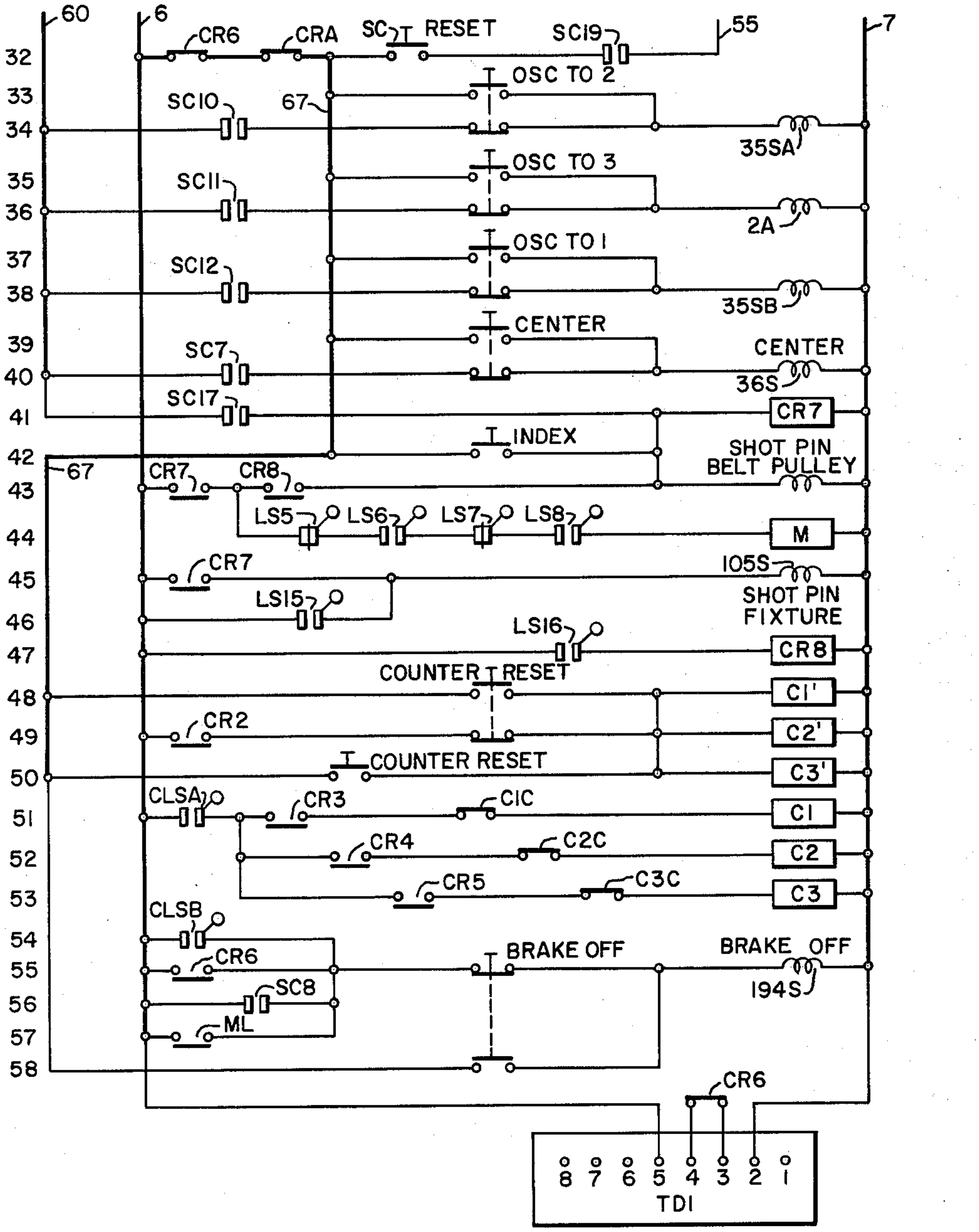
Figure 14:
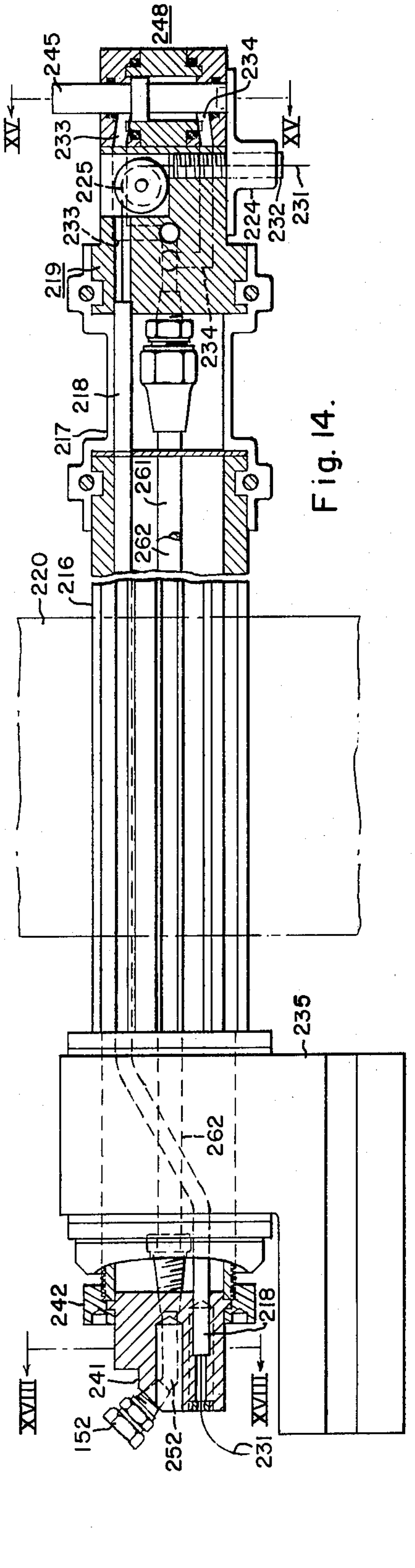
Figure 15:
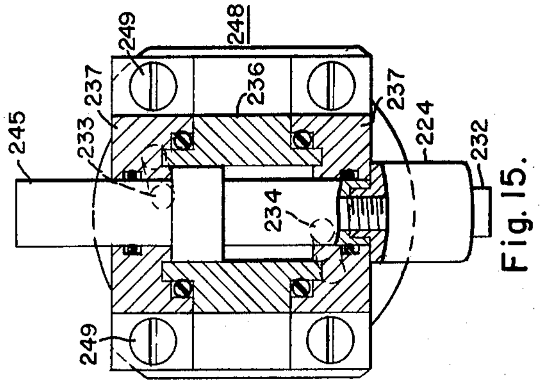
Figure 16:
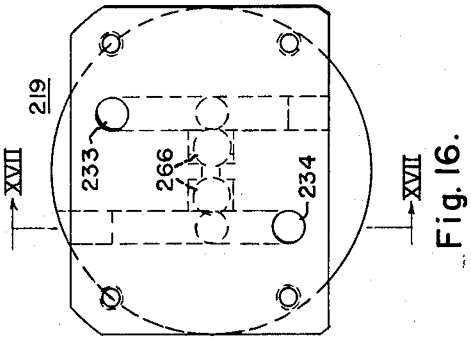
Figure 17:
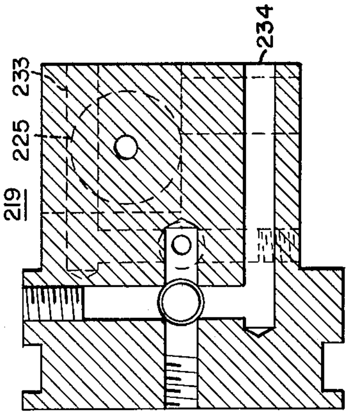

FIGS. 13A and 13B, when placed end-to-end, constitute a diagram of the electrical control system for the machine;

FIG. 14 is a view, partly in elevation and partly in section, of a modified needle and winding head assembly;

FIG. 15 is an enlarged view, in section, taken along the line XV—XV in FIG. 14;

FIG. 16 is a view, in end elevation, of the winding head shown in FIG. 14, the flopper and flopper cylinder being removed;

FIG. 17 is a sectional view, taken along the line XVII—XVII in FIG. 16; and

Figure 18:
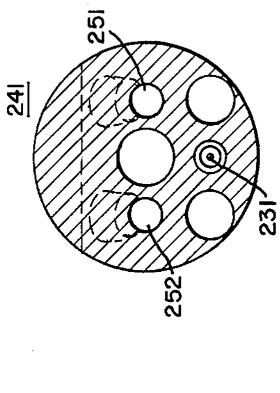

FIG. 18 is an enlarged sectional view, taken along the line XVIII—XVIII in FIG. 14.

Figure 1:
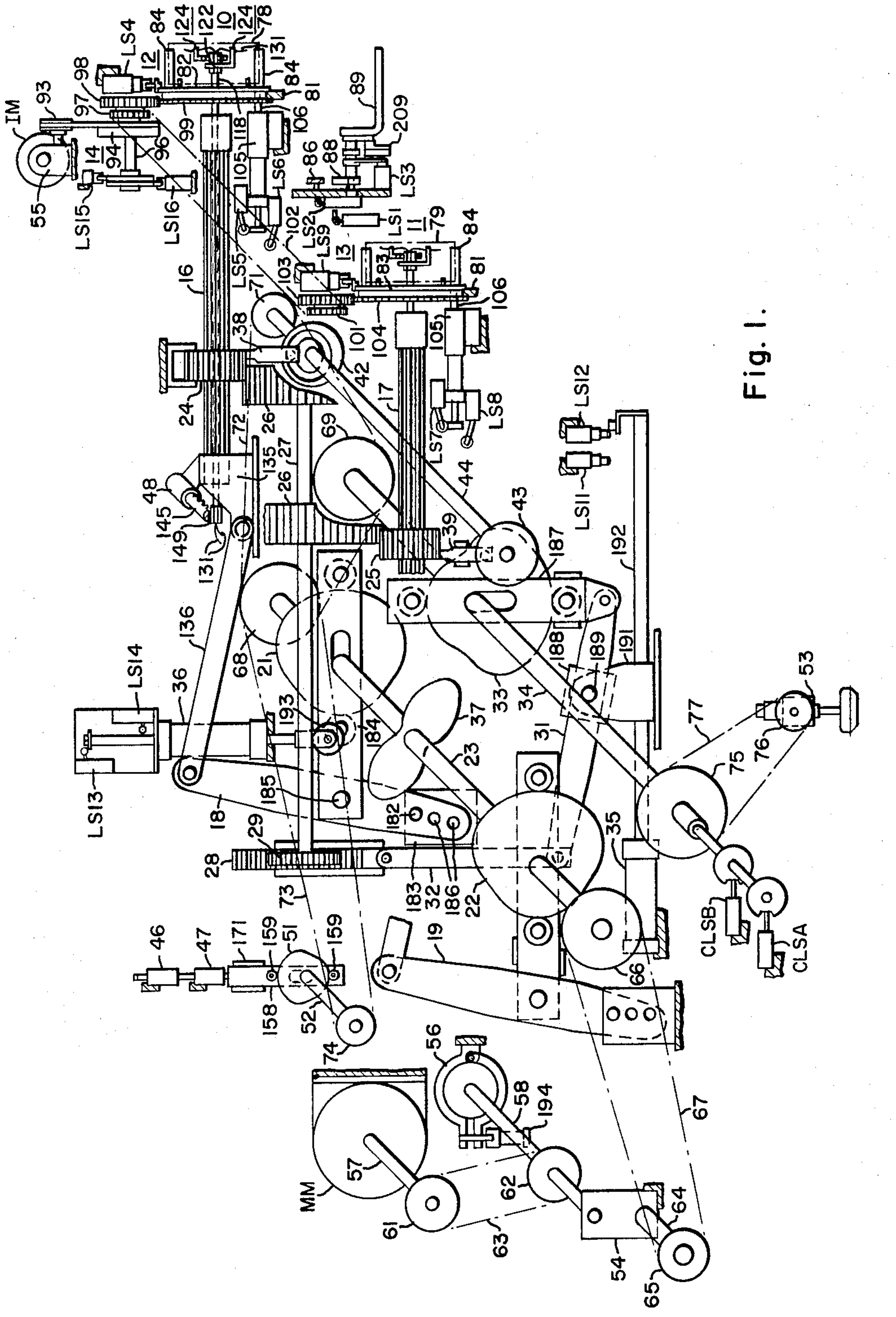
FIGURE 1 is a diagrammatic view of a winding machine embodying principal features of the invention.

Referring to the drawing, and particularly to FIG. 1, the winding machine shown therein comprises two winding heads 10 and 11, two chuck box assemblies 12 and 13, an indexing mechanism 14, two needles 16 and 17, reciprocating levers 18 and 19 for reciprocating the needles 16 and 17, respectively, reciprocating cams 21 and 22 for actuating the reciprocating levers 18 and 19, respectively, a main drive shaft 23 for driving the cams 21 and 22, oscillation gears 24 and 25 for oscillating or rotating the needles 16 and 17, respectively, a gear 26 for driving the gears 24 and 25, a shaft 27 to which the gear 26 is secured, a rack 28 for driving a gear 29 secured to one end of the shaft 27, an oscillation lever 31 having one end connected to the rack 28 by a link 32, an oscillation cam 33 for actuating the oscillation lever 31, a shaft 34 for driving the oscillation cam 33, an oscillation change cylinder 35, a centering cylinder 36, a centering cam 37 secured to the main drive shaft 23, shot pins 38 and 39 for engaging the oscillation gears 24 and 25, respectively, shot pin cams 42 and 43 for actuating the shot pins 38 and 39, respectively, a shot pin shaft 44 for driving the cams 42 and 43, master hydraulic cylinders 46 and 47 which are connected to slave cylinders 48 and 49, respectively, only the cylinder 48 being shown in FIG. 1, a flopper cam 51 for actuating pistons in the master cylinders 46 and 47, a shaft 52 for driving the cam 51, a pump 53 for supplying oil to the hydraulic system, a main drive motor MM, a gear box 54, an index motor IM, a gear box 55 for the index motor IM, and a brake 56.

In order that all of the cams will be driven simultaneously or in synchronism, a shaft 57 of the main motor MM drives a shaft 58 for the gear box 54 through pulleys 61 and 62 and a belt 63. An output shaft 64 of the gear box 54 is connected to the main drive shaft 23 by means of sprockets 65 and 66 and a chain 67. A sprocket 68 on the end of the main drive shaft 23 opposite the sprocket 66 is connected to a sprocket 69 on the oscillation shaft 34, and a sprocket 71 on the shot pin shaft 44 by a chain 72. The main drive shaft 23 is also connected to the flopper cam shaft 52 by means of an extra row of teeth on the sprocket 68, a chain 73 and a sprocket 74. The oscillation shaft 34 drives the pump 53 through a sprocket 75, a sprocket 76 on the pump and a chain 77. In this manner the operating members of the winding machine are driven in synchronism.

With a view towards simplifying and clarifying the drawing, the enclosing housing and the supporting framework for the machine have been omitted. The bearings and bearing supports for the various shafts have been omitted. Other supporting members for certain parts of the machine have also been omitted. Since there are two identical winding heads 10 and 11 which are operated simultaneously, thereby winding two stator cores 78 and 79 at the same time, the structure and operation of only one winding head will be described.

Figure 2:
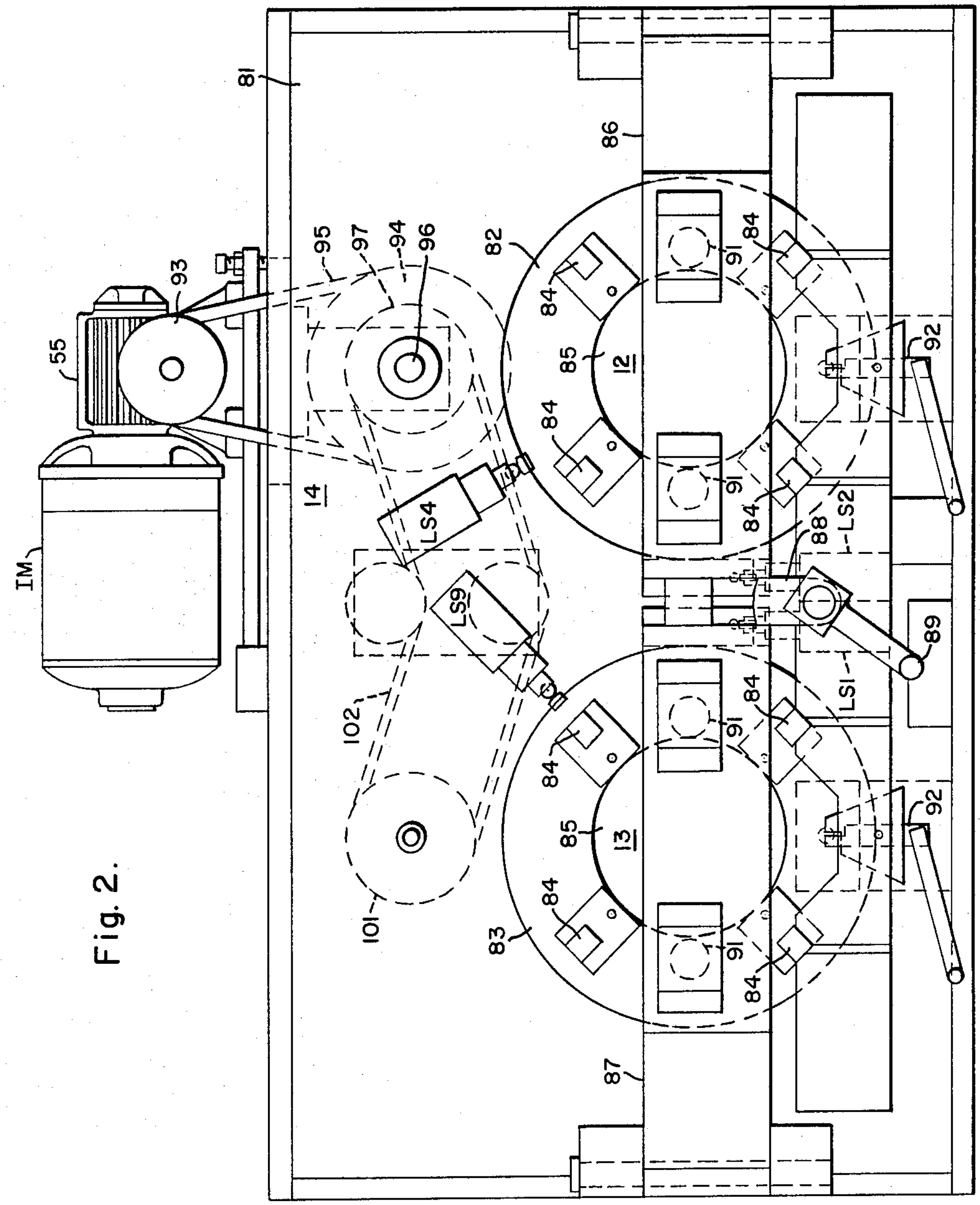
FIG. 2 is a view, in front elevation, of the chuck box assembly for holding stator cores and the indexing mechanism for rotating the cores during the winding operation.

During the winding operation, the two stator cores 78 and 79 are mounted in the chuck box assemblies 12 and 13, respectively, details of which are shown in FIG. 2. The chuck box assembly comprises a supporting frame 81 in which plates 82 and 83 are rotatably mounted. Four equally spaced horizontally extending bars 84 are secured to each one of the plates 82 and 83 for supporting a stator core. Each plate has a central opening 85 therein through which a winding head extends. When a stator core is in position on the plate 82 a hinged gate 86 is closed. Likewise, when a stator core is in position on the plate 83 a hinged gate 87 is closed. The gates 86 and 87 are locked by a latch 88 actuated by a manually operable lever 89. The stator cores are held in position between the bars 84 by means of air pressure cylinders 91, two of which are mounted on each one of the gates 86 and 87. A manually operable wire cutter 92 is provided for each stator core.

Since each motor stator has a plurality of poles, it is necessary to rotate the stator through a predetermined number of degrees, depending upon the number of poles, when the winding of the coils for each pole or poles is completed. The indexing mechanism 14 for rotating the stators is driven by the indexing motor IM which is mounted on top of the supporting frame 81. The indexing motor drives the gear box 55, the output shaft of which drives a pulley 93. The pulley 93 drives a pulley 94 through a belt 95. The pulley 94 is secured to a shaft 96 to which a sprocket 97 and a gear 98 are secured. The gear 98 drives a ring gear 99 secured to the plate 82 of the chuck box assembly 12. The sprocket 97 drives a sprocket 101 through a chain 102. As shown in FIG. 1, the sprocket 101 is attached to a gear 103 which drives a ring gear 104 secured to the rotatable plate 83 of the chuck box assembly 13.

Thus, the motor IM rotates both stator cores upon the completion of the winding of the coils for a pole or a pair of poles depending upon whether each winding head is of a type which winds only one pole at a time or two poles simultaneously. An air pressure cylinder 105 (FIG. 1) actuates a pin 106 into indexing holes provided in the ring gear 99 to lock the gear in the proper indexing positions. A similar locking mechanism is provided for the ring gear 104 of the chuck box assembly 13.

Figure 10:
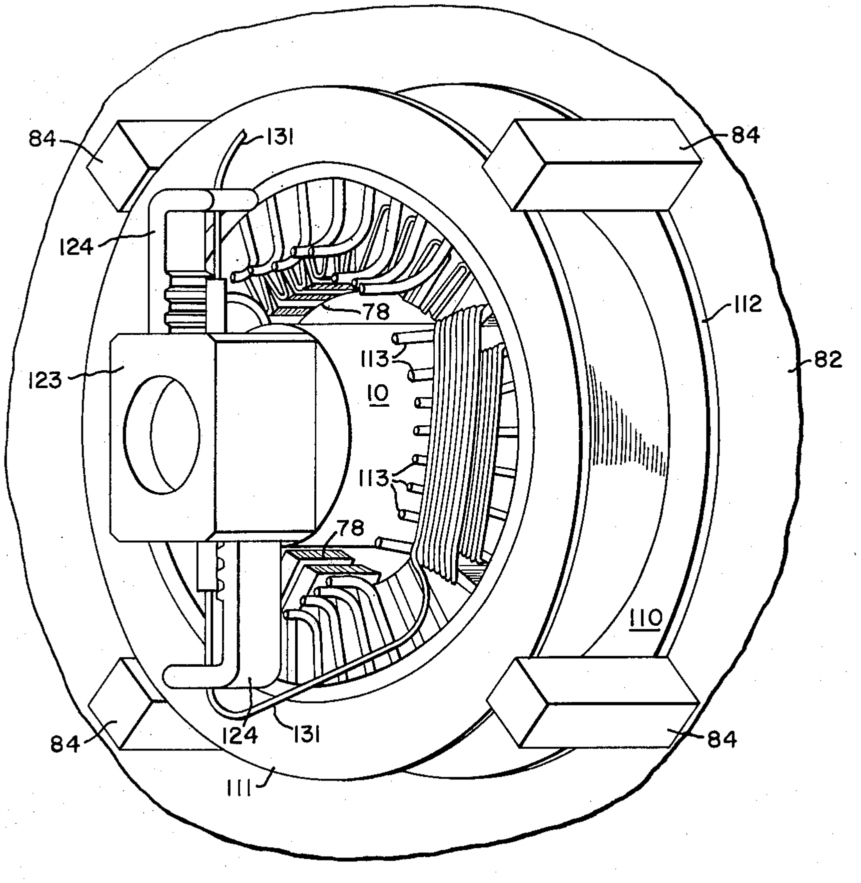
FIG. 10 is a view, in perspective, of a stator core and its loading fixture showing the position of the core relative to the winding head.

The manner in which a stator core 78 is mounted in the machine is shown in FIG. 10. The stator core is held in a fixture 110 comprising two spaced annular members 111 and 112. The outside diameter of these members is such that they just fit within the four equally spaced mounting bars 84 secured to the rotatable plate 82. Each one of the members 111 and 112 carries a plurality of wire guide fingers 113 pivotally mounted thereon. The wire guide fingers 113 cooperate with the floppers 124 to form the coil end loops at the opposite ends of the stator during the winding operation. The fingers are shaped to facilitate disassembly of the fixture from the stator core after the windings are completed.

Figure 11:
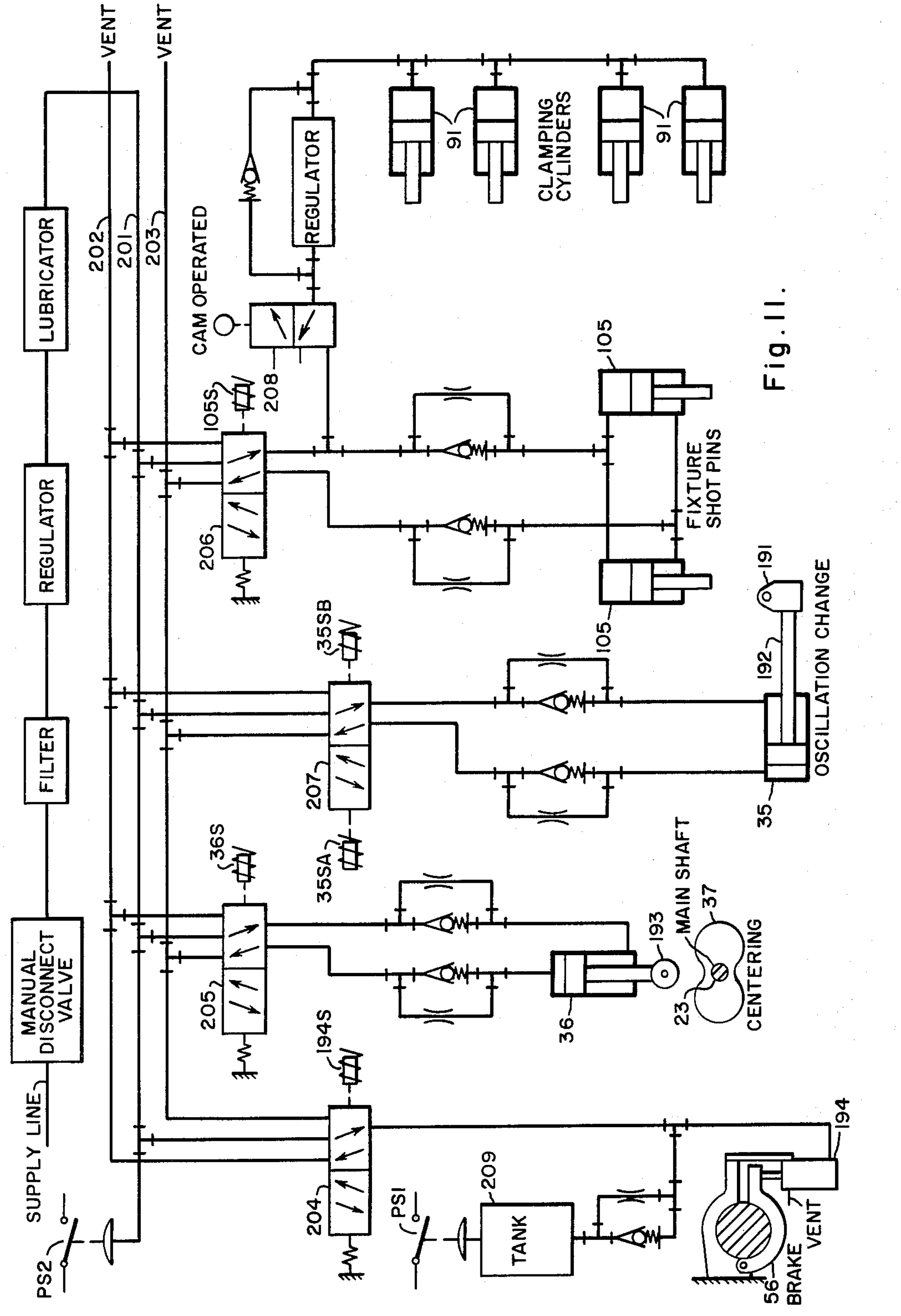
FIG. 11 is a diagram of the pneumatic system utilized in the machine.

As explained hereinbefore, each mounting fixture 110 is held in place during the winding operation by the air pressure cylinders 91. These air pressure cylinders are carried by the gates 86 and 87 and are not shown in FIG. 10. They are shown in FIGS. 2 and 11. In FIG. 10 it is assumed that the winding of the coils for one pair of poles has been completed and that the stator core has been rotated to the position for starting the winding of another pair of poles. When the winding is completed the fixture 110 is removed from the machine and the stator core is removed from between the members 111 and 112. Another stator core is then placed in the fixture which is then placed in the machine and the winding operation is repeated.

Figures 3, 4, 5, 6:
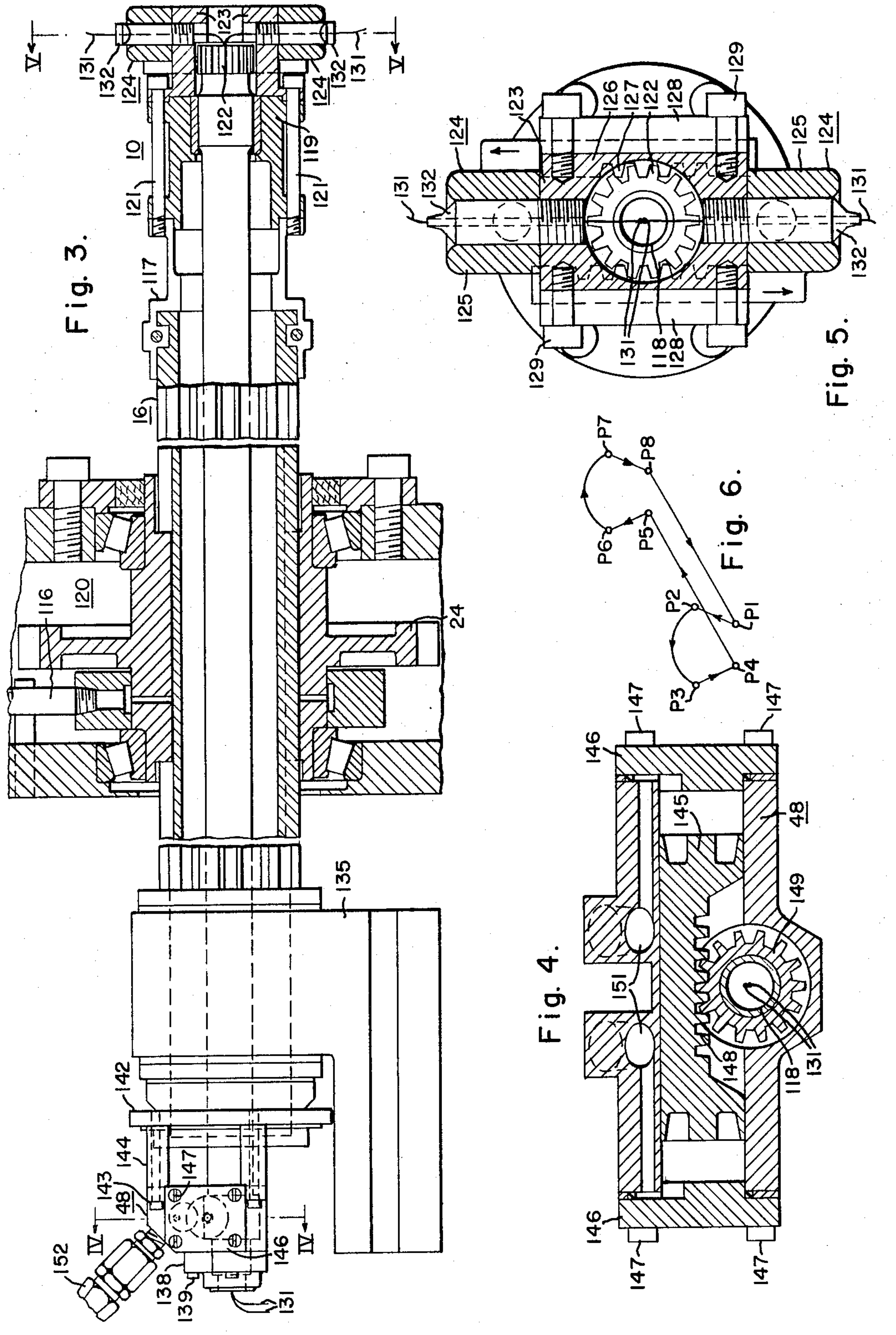
FIG. 3 is a view, partly in elevation and partly in section, of a needle and winding head assembly for the winding machine.
FIG. 4 is an enlarged view, in section, taken along the line IV—IV in FIG. 3.
FIG. 5 is an enlarged view, in section, taken along the line V—V in FIG. 3.
FIG. 6 is a diagrammatic view of the path followed by one of the floppers during the winding operation.

As shown most clearly in FIG. 3, the needle 16 is a hollow cylinder which is splined in the gear 24 rotatably mounted in a roller bearing 120 which is supported in a suitable manner in the frame of the machine. Thus, the needle 16 may be moved axially through the gear 24 and it may be rotated or oscillated about its longitudinal axis. Since the roller bearing 120 may be of the usual construction it will not be described in detail. Provision is made for lubricating the bearing through a fitting 116. The winding head 10 is attached to the front end of the needle 16 by means of a split connector 117. A hollow shaft 118 is rotatably mounted inside the needle 16. The front end of the shaft 118 is supported by a bearing retainer 119 which is attached to the connector 117 by bolts 121. A pinion or gear 122 is secured to the front end of the shaft 118. The gear 122 is disposed in an opening in a supporting block 123 attached to the connector 117 by the bolts 121 which extend through the bearing retainer 119 as previously explained. Two floppers 124 are slidably mounted in the supporting block 123.

As shown most clearly in FIG. 5, each flopper 124 comprises a head portion 125 having an opening therethrough and a shank portion 126 having teeth 127 thereon engaging the teeth of the gear 122. The floppers 124 are retained by bearing plates 128 attached to the supporting block 123 by screws 129. When the gear 122 is rotated counterclockwise, as viewed in FIG. 5, the upper flopper 124 is extended or moved upwardly and the lower flopper 124 is extended downwardly. When the gear 122 is rotated clockwise, the floppers are retracted or moved inwardly to the position shown in the drawing. Two wires 131, which enter the rear end of the hollow shaft 118, are fed outwardly through nozzles 132 disposed in the openings in the flopper heads 125 and threaded into the supporting block 123.

As shown in FIG. 3, the rear end of the splined needle 16 is rotatably mounted in a cross head 135 which is connected to the reciprocating lever 18 by a link 136 as shown in FIG. 1. Thus, the cross head 135 and the needle 16 are reciprocated by the lever 18 as will be more fully described hereinafter. The bearing for supporting the rear end of the needle in the cross head 135 may be of any suitable type and will not be described in detail. The needle 16 is rotated or oscillated by means of the gear 24 in a manner which will be described more fully hereinafter.

As shown in FIG. 3, the rear end of the shaft 118 is supported in a bearing 138 attached to the slave cylinder 48. The bearing housing 138 is attached to the cylinder 48 by screws 139. The slave cylinder 48 is attached to a flanged cap 142 on the rear end of the needle 16 by means of bolts 143 which extend through legs 144 on the cylinder 48.

As shown most clearly in FIG. 4, the slave cylinder 48 contains a piston 145 slidably disposed therein. End caps 146 are attached to opposite ends of the slave cylinder 48 by means of screws 147. The piston 145 contains teeth forming a rack 148 which mesh with the teeth of a gear or pinion 149 secured to the shaft 118. Hydraulic fluid is admitted to and exhausted from opposite ends of the cylinder 48 through ports 151. Hose fittings 152 (FIG. 3) are provided for the ports 151. Thus, when hydraulic fluid is forced into the right hand end of the cylinder 48, as viewed in FIG. 4, the piston 145, is forced to the left and the hydraulic fluid is exhausted through the port 151 connected to the left hand end of the cylinder 48. Likewise, when hydraulic fluid is forced into the left hand end of the cylinder 48 the piston 145 is moved to the right and the hydraulic fluid is exhausted through the port 151 connected to the right hand end of the cylinder. In this manner the gear 149 rotated by the rack 148 to rotate or oscillate the shaft 118 back and forth which, in turn, rotates or oscillates the gear 122 on the front end of the shaft 118 to extend and retract the floppers 124 in the manner hereinbefore described.

Figures 7, 8, 9:
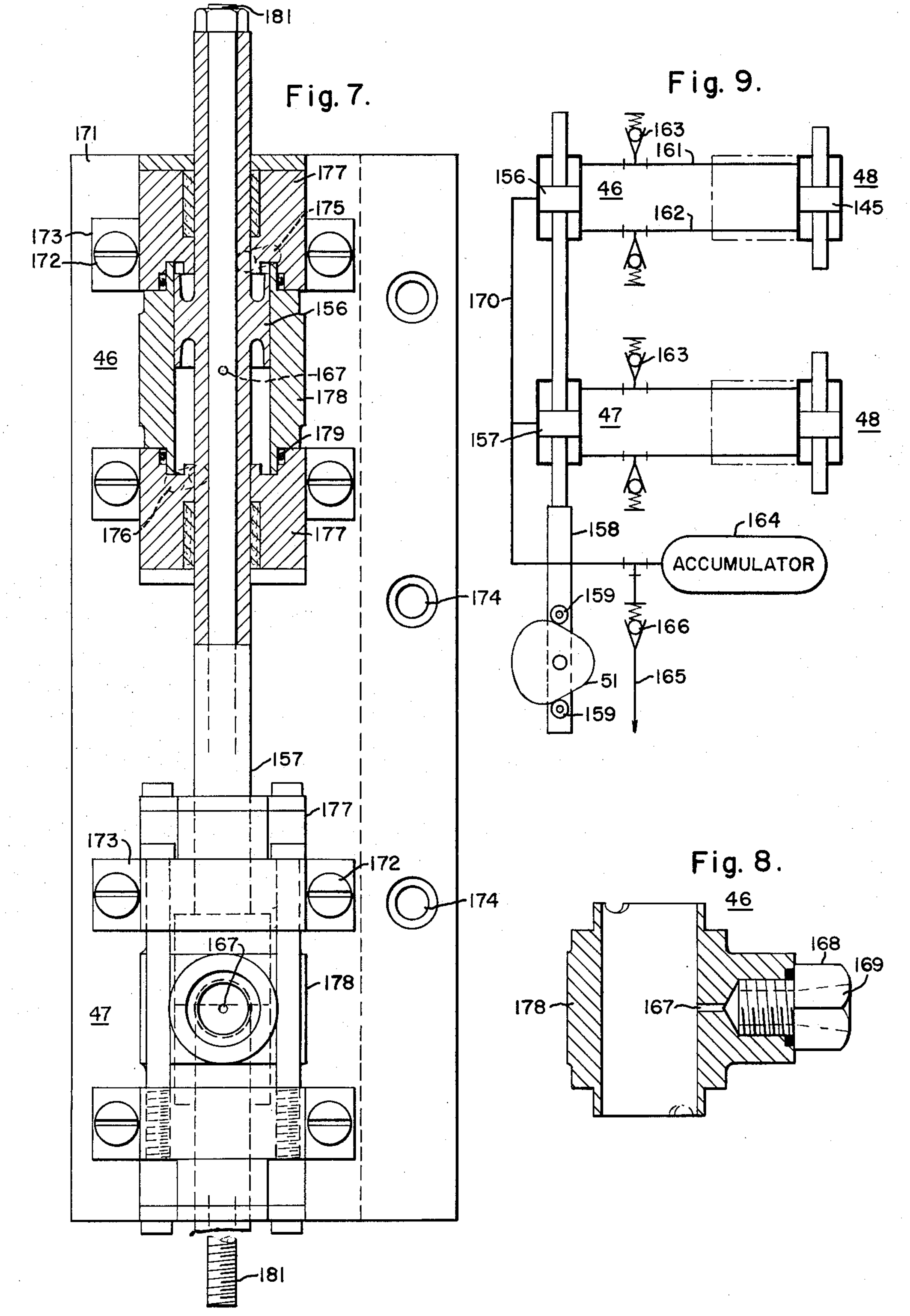
FIG. 7 is an enlarged view, partly in elevation and partly in section, of master hydraulic cylinders utilized in the winding machine.
FIG. 8 is a detail view, in section, of a portion of one of the master cylinders.
FIG. 9 is a diagram of the hydraulic system utilized in the winding machine.

As explained hereinbefore, each slave cylinder 48 is connected to a master cylinder in a closed hydraulic system shown diagrammatically in FIG. 9. Thus, one end of a slave cylinder 48 for one winding head is connected to one end of the one master cylinder 46. The other end of the slave cylinder 48 is connected to the other end of the master cylinder 46. Likewise, the slave cylinder for the other winding head is connected to the other master cylinder 47. Pistons 156 and 157 in the master cylinders 46 and 47, respectively, are actuated by the flopper cam 51 through a follower 158 which is of the positive type having rollers 159 thereon for engaging the cam 51. Thus, when the piston 156 is moved upwardly in the cylinder 46, oil is forced through a line 161 to the upper end of the slave cylinder 48, thereby forcing the piston 145 downwardly and oil is returned to the lower end of the cylinder 46 through a line 162. When the piston 156 is moved downwardly oil is forced from the lower end of the cylinder 46 through the line 162 to force the piston 145 upwardly and oil is returned to the cylinder 46 through the line 161. Since the master cylinder and the slave cylinder have the same volume, movement of the slave piston follows the movement of the master piston.

Pressure relief valves 163 of the usual type are connected to the lines 161 and 162. Any make-up oil required for the hydraulic system is supplied from an accumulator 164 which is connected to the pump 53 (shown in FIG. 1) through a line 165. A check valve 166 is provided in the line 165. The accumulator 164 is connected to a small opening 167 at the middle of each master cylinder 46 and 47 (see FIG. 7). As shown in FIG. 8, a screw 168 in the side of the master cylinder 46 has an opening 169 therethrough to which a line 170 from the accumulator 164 is attached, thereby permitting oil to enter the cylinder 46 through the opening 167 when the piston 156 is at one or the other of the ends of the cylinder 46.

The construction of the master cylinders 46 and 47 is shown in FIG. 7. Since the two cylinders are similar the structure of only the cylinder 46 will be described. As shown, the cylinder is attached to a supporting panel 171 by bolts 172 extending through lugs 173 on the cylinder. The panel 171 may be attached to the frame of the machine by bolts extending through openings 174 in the panel 171. A port 175 is provided at one end of the cylinder to which the oil line 161 is attached. Likewise, a port 176 is provided at the other end of the cylinder to which the oil line 162 is attached. End members 177 are provided at opposite ends of a central member 178. Sealing rings 179 are provided between the central member 178 and the end members 177. The pistons 156 and 157 for the cylinders 46 and 47, respectively, are joined together by a through bolt 181 which extends through both cylinders and is threaded into the end of the follower 158 which is actuated by the cam 51 as previously explained. Thus, the pistons 156 and 157 are reciprocated simultaneously by the cam 51 which is driven in synchronism with the other cams of the machine in the manner hereinbefore described. Since the movement of each slave piston follows the movement of its master piston, the operation of the floppers 124, which are actuated by the slave pistons is properly timed with the other members of the winding mechanism.

The provision of the hydraulic means for operating the floppers simplifies the structure and operation of the winding machine as compared with prior machines in which the floppers are mechanically operated. Furthermore, the flexibility of the machine is increased since the stroke of the floppers may be changed by changing the volume of the master cylinders.

Referring again to FIG. 1, it will be seen that the crosshead 135 is reciprocated by the lever 18, thereby reciprocating the splined needle 16. The lever 18 is pivoted on a pin 182 disposed in a support 183. The reciprocating lever 18 is actuated by the cam 21 through a follower 184 which is attached to the lever 18 by a pin 185. As previously explained, the cam 21 is driven by the main shaft 23 which is driven by the main motor MM in the manner previously described. The effective length of the lever 18 may be changed by changing the location of the pin 182 in openings 186 provided in the lever. Additional openings may be provided at the upper end of the lever 18 to change the connection for the link 136. In this manner the length of the stroke of the needle 16 may be changed to wind stator cores of different lengths. The needle 17 for the other winding head 11 is reciprocated by the lever 19 and the cam 22 in the same manner as the needle 16.

The needles 16 and 17 are oscillated by the gear 26 which meshes with the gears 24 and 25 on the needles 16 and 17 respectively. In order to clarify the drawing, the gear 26 is shown seperated in two parts in FIG. 1. In the actual machine one gear 26 is disposed between the gears 24 and 25 and meshes with both gears. The gear 26 is driven by the shaft 27, which, in turn, is driven by the gear 29 engaged by the rack 28. The rack 28 is reciprocated by the oscillation lever 31 which is actuated by the oscillation cam 33 through a follower 187. The cam 33 is driven by the shaft 34 which, in turn, is driven by the motor MM in the manner previously described.

In order to change the degree of oscillation of the needles 16 and 17, thereby enabling the machine to wind coils of different spans, the pivot point of the lever 31 may be changed to change the relative lengths of the two arms of the lever 31. A fulcrum member 188 is slidably disposed on the lever 31. The member 188 is pivoted at 189 on a movable support 191. The support 191 can be moved horizontally by means of the air pressure cylinder 35 which has a piston therein attached to the support 191 by a rod 192. Changing the pivot point of the lever 31 changes the travel of the rack 28 thereby changing the degree of oscillation of the needles 16 and 17.

In order to facilitate changing the position of the support 191, the centering cylinder 36 has a piston therein which actuates a roller 193 to engage the centering cam 37 on the main drive shaft 23. When the machine is stopped, sufficient pressure is applied on the centering cam 37 by the roller 193 to cause the shaft 23 and hence the shaft 34 and the oscillation cam 33 to be rotated to a position in which the oscillation lever 31 is substantially horizontal. The fulcrum 188 can then be slid along the lever 31 by moving the support 191 by means of the air pressure cylinder 35, the movement being controlled and the support 191 accurately positioned by means of limit switches LS11 and LS12.

It will be understood that the oscillation change is effected automatically upon the completion of the winding of a coil of one span in order to enable a coil of a different span to be wound. As shown in the drawing, the oscillation may be changed to wind coils of two different spans. Provision may be made for winding coils of three different spans by adding another limit switch similar to the limit switches LS11 and LS12 and by changing the mechanism to move the support 191 to three different positions.

The operation of the winding head in making one complete coil turn may be understood by referring to FIG. 6 which shows a diagram of the movement of one flopper during the winding operation. Assuming that the flopper has moved forwardly to the position P1, the flopper is extended by the hydraulic means to the position P2. The flopper is then oscillated by the oscillating mechanism to cause the wire to engage the fingers 113 to form an end turn of the winding. When the oscillation is completed at P3 the flopper is retracted to position P4. The flopper is then reciprocated to position P5. thereby laying a wire in the stator slot. From position P5 the flopper is extended to position P6 and then oscillated to position P7 to form an end turn at the opposite end of the stator core. The flopper is then retracted to position P8 from which it is reciprocated to positon P1, thereby completing one coil turn. Thus, it will be seen that the mechanically operated reciprocating and oscillating means cooperate with the hydraulic means to cause the flopper to form the desired pattern for each coil turn.

The shot pins 38 and 39 engage the gears 24 and 25, respectively, to retain the needle and the winding head in the proper oscillation position during the reciprocating strokes of the needles and the winding heads. The shot pins 38 and 39 are actuated by the cams 42 and 43, respectively, which are driven by the shot pin shaft 44 which, in turn, is driven by the main drive shaft 23 through sprockets 68 and 71 and the chain 72. Since the chain 72 also drives the oscillation shaft 34 through the sprocket 69, the operation of the shot pins is properly timed with the reciprocating and the oscillating movements.

In order that the second pair of poles in a four pole stator will be of the opposite polarity from the first pair of poles it is necessary to reverse the direction of movement of the winding head shuttles or floppers during the winding of the second pair of poles. Therefore, provision is made for reversing the main drive motor MM when the winding of the first pair of poles is completed. This is done by means of reversing switches which change the phase connections for the main drive motor.

Provision is also made for operating the winding machine at a lower speed during the winding of the first few turns of the stator coil. Thus, the main motor has a low speed winding and a high speed winding. The low speed winding is energized at the beginning of the winding of a coil or coils. After a predetermined time, switching means are operated to change the motor connection from the low speed winding to the high speed winding. The operation of the switching means is controlled by a time delay TD1 (FIG. 13B) of a well known bellows type available commercially.

The pneumatic system for the machine is shown diagrammatically in FIG. 11. In addition to the centering cylinder 36, the oscillation change cylinder 35, the fixture locking pin cylinders 105 and the clamping cylinders 91, previously mentioned, a brake cylinder 194 is also connected in the pneumatic system. Air is supplied to a pressure line 201 from a supply line through a manually operated disconnect valve, a filter, a regulator and a lubricator. A pressure switch PS2 is closed when the air in the line 201 is at a predetermined pressure. Two exhaust or vent lines 202 and 203 are provided. Air valves 204, 205 and 206 are of a type which are actuated to one position by an electric solenoid and are returned to the other position by a spring. An air valve 207 is of the double solenoid type and a valve 208 is actuated by a cam which is connected to the operating handle 89 of the latch for the chuck box gates.

When the valve 204 is in the position shown in the drawing, air is admitted to the cylinder 194 to apply the brake 56. Pressure is also maintained in a tank 209 to close the pressure switch PS1. When the solenoid 194S is energized, the valve 204 is actuated to a position in which air is exhausted from the cylinder 194 to release the brake 56.

When the valve 205 is in the position shown, air pressure is applied to the cylinder 36 to maintain the roller 193 in its uppermost position. When the solenoid 36S is energized, the valve 205 is actuated to apply pressure to the upper side of the piston in the cylinder 36 and to exhaust air from the lower side of the piston, thereby forcing the roller 193 downwardly against the centering cam 37.

Likewise, the valve 206 is actuated by the solenoid 105S to control the operation of the pistons in the fixture locking pin cylinders 105 which are part of the indexing mechanism as previously described. The valve 207 is actuated by the solenoids 35SA and 35SB to control the operation of the piston in the oscillation change cylinder 35.

As previously explained, the valve 208 is actuated by a cam on the handle which operates the latch for the chuck box gates. Thus, pressure is applied by the clamp cylinders 91 to hold the stator cores in position in the chuck box during the winding operation.

The electrical control system, which is shown in FIGS. 13A and 13B, is similar to the control systems which have been used in prior winding machines of the present type. Therefore, the control system will not be described in detail. The control system comprises a plurality of control relays having the general designation CR, a plurality of limit switches having the general designation LS, manually operated push buttons, counting relays C1, C2 and C3 which are of a type well known in the art, and a sequence controller which may be of a solenoid ratchet operated type available commercially, and controlled by a solenoid coil SC.

As previously explained, the direction of operation of the main drive motor MM is controlled by reversing switches F and R. The speed of the main motor MM is controlled by switches or contactors L and H which control the energization of the different windings on the motor MM. The energization of the index motor IM is controlled by a contactor M. A manually operable line switch LS is provided for connecting the motors to a suitable three phase power source.

When the machine is set for automatic operation, the winding operations are performed in the proper sequence under the control of the sequence controller SC. The sequence of operations is given in the chart in FIG. 12. As shown in this chart, there are sixteen steps, corresponding to sixteen controller positions for a winding requiring three oscillation changes or coil spans for each pair of poles of the motor stator. The contact numbers given on the chart appear on the wiring diagram designating contact members SC1 to SC19 of the sequence controller. The diagram line numbers appearing on the chart refer to the column of numbers at the left-hand side of the wiring diagram.

The relative location and the manner of operating the various limit switches are shown in FIG. 1. The winding operation is started when the operator has closed and latched the chuck box gates 86 and 87 to actuate the limit switches LS1, LS2 and LS3. It is stopped by the sequence controller upon the completion of the stator windings, whereupon it is necessary for the operator to remove the completed stators and reload the machine. The operation of the electrical system to control the necessary operations of the machine in the proper sequence under control of the limit switches and sequence controller will be apparent from FIGS. 12, 13A and 13B, and since this is a known type of control system and is not a part of the present invention, it will not be further described.

In the modified needle and winding head assembly shown in FIGS. 14 to 18, a splined needle 216 is reciprocably and rotatably mounted in a bearing and gear assembly 220 which is similar to the bearing and gear assembly 120 shown in FIG. 3. A split connector 217 which is attached to the front end of the needle 216 supports a winding head member 219. A wire 231 enters a tube 218 at the rear end of the needle, passes through the tube 218 and out over a pulley 225 through a nozzle 232 threaded into the member 219. A flopper 224 having an opening therein for the nozzle 232 is actuated by a piston 245 in a slave cylinder 248. The flopper 224 is secured to the lower end of the piston 245. The slave cylinder assembly 248 is attached to the member 219 by screws 249.

As shown most clearly in FIG. 15, the slave cylinder assembly 248 comprises a central member 236 and two end members 237. Passageways 233 and 234 in the slave cylinder 248 coincide with similar passageways in the member 219 and are connected with tubes 261 and 262, respectively, which extend through the inside of the needle to a member 241 which is mounted on the rear end of the needle.

As shown most clearly in FIG. 18, the member 241 has passageways 251 and 252 therein for connecting the tubes 261 and 262, respectively, to the hydraulic lines 161 and 162, respectively. In this manner the master cylinder 46 is connected to the slave cylinder 248 to actuate the piston 245 in accordance with the movement of the piston 156 in the master cylinder 46 in the manner hereinbefore described. Thus, the flopper 224 is directly actuated hydraulically by the slave cylinder 248 which is mounted directly on the winding head member 219.

The rear end of the needle 216 is rotatably mounted in the crosshead 235 in the manner hereinbefore described. The member 241 is attached to the rear end of the needle 216 by a flanged nut 242 which is threaded onto the rear end of the needle 216.

Check valves 266 are disposed in the member 219 to interconnect the passageways 233 and 234 as shown in FIG. 16. Since the slave cylinder 248 is connected with the master cylinder 46 in a closed hydraulic system, the movement of the piston 245 follows the movement of the master piston 156 to actuate the flopper 224. The master piston 156 is actuated by the flopper cam 51 in the manner hereinbefore described.

From the foregoing description it is apparent that a winding machine having the combined mechanical and hydraulic features hereinbefore described has several advantages over prior machines which have been entirely mechanically operated or entirely hydraulically operated. The mechanical and hydraulic features of the present machine are so coordinated that the timing between the parts of the machine is maintained correct. Since the axial or reciprocating motion of the needle, the oscillation motion of the needle and the stroke of the flopper are controlled by independent cams, which can be given any desired rise and fall motion, any desired motion pattern of these items can be obtained through the proper selection of cams. Furthermore, since the flopper or slave cylinder is small and light in weight, high rates of flopper speeds can be obtained with the present machine. Consequently, the optimum winding motions can be obtained at high speeds. The present machine is more simple in structure than prior machines and operates more smoothly. The present machine has a higher degree of flexibility than prior machines. The flopper stroke can be changed by changing the volume of the master cylinder, and the stroke and the oscillation of the needle can be changed without changing the floppers.

Since numerous changes may be made in the above-described construction and different embodiments of the invention may be made without departing from the spirit and scope thereof, it is intended that all subject matter contained in the foregoing description or shown in the accompanying drawings shall be interpreted as illustrative and not in a limiting sense.

We claim as our invention:

1. In a machine for winding wire into slots in a generally cylindrical core, in combination, a wire feeding head, a first cam means for reciprocating said head axially of the core in a wire inserting stroke, a second cam means for oscillating the head about the axis of the core, a slave hydraulic cylinder mounted in the head, a slave piston in the cylinder, a wire guiding flopper actuated by the slave piston, a master hydraulic cylinder connected to the slave cylinder, a master piston in the master cylinder, a third cam means for actuating the master piston to operate the slave piston and the flopper, and a motor for driving said three cam means in synchronism.

2. In a machine for winding wire into slots in a generally cylindrical core, in combination, a wire feeding head, a first cam means for reciprocating said head axially of the core in a wire inserting stroke, a second cam means for oscillating the head about the axis of the core, a master hydraulic cylinder, a piston in the master cylinder, a slave hydraulic cylinder connected to the master cylinder in a closed hydraulic system, a piston in the slave cylinder, a wire guiding flopper actuated by the slave piston, a third cam means for actuating the master piston to operate the slave piston and the flopper, and a motor for driving said three cam means in synchronism.

3. A coil winding machine for inserting wire into slots in a generally cylindrical core, comprising a hollow needle through which the wire passes, a wire feeding head on one end of the needle, a first cam means for reciprocating the needle and the head axially of the core in wire inserting strokes, a second cam means for oscillating the needle and the head at the ends of the reciprocating strokes, a wire guiding flopper movably mounted in the head, a slave hydraulic cylinder carried by the needle, a slave piston in the slave cylinder for actuating the flopper, a master hydraulic cylinder connected to the slave cylinder in a closed hydraulic system, a master piston in the master cylinder, a third cam means for actuating the master piston to operate the slave piston and the flopper, and a motor for driving said three cam means in synchronism.

4. A coil winding machine for inserting wire into slots in a generally cylindrical core, comprising a hollow needle through which the wire passes, a wire feeding head on one end of the needle, a first cam means for reciprocating the needle and the head axially of the core in wire inserting strokes, a second cam means for oscillating the needle and the head at the end of the reciprocating strokes, two oppositely disposed wire guiding floppers carried by the head, rack and gear means for simultaneously extending the floppers away from the head and for retracting the floppers toward the head, a slave hydraulic cylinder carried by the needle, a slave piston in the slave cylinder for actuating the rack and gear means, a master hydraulic cylinder connected to the slave cylinder in a closed hydraulic system, a master piston in the master cylinder, a third cam means for actuating the master piston to operate the slave piston, and a motor for driving said three cam means simultaneously.

5. A coil winding machine for inserting wire into slots in a generally cylindrical core, comprising a hollow needle through which the wire passes, a wire feeding head on one end of the needle, a first cam means for reciprocating the needle and the head axially of the core in wire inserting strokes, a second cam means for oscillating the needle and the head at the ends of the reciprocating strokes, two oppositely disposed wire guiding floppers carried by the head, a first rack and gear means in the head for simultaneously extending the floppers away from the head and for retracting the floppers toward the head, a slave hydraulic cylinder on the end of the needle opposite the head, a slave piston in the slave cylinder, a second rack and gear means actuated by the slave piston, a shaft extending through the needle connecting said first and second rack and gear means, a master hydraulic cylinder connected to the slave cylinder in a closed hydraulic system, a master piston in the master cylinder, a third cam means for actuating the master piston to operate the slave piston, and a motor for driving said three cam means simultaneously.

References Cited by the Examiner

UNITED STATES PATENTS

| | | | |
|---|---|---|---|
| 2,304,520 | 12/1942 | Wirtz et al. | 242—1.1 |
| 2,579,585 | 12/1951 | Klinksiek | 242—1.1 |
| 2,770,424 | 11/1956 | Grove | 242—1.1 |
| 3,052,418 | 9/1962 | Gorski et al. | 242—1.1 |
| 3,082,966 | 3/1963 | Frederick | 242—1.1 |
| 3,102,696 | 9/1963 | Larsh | 242—1.1 |
| 3,169,301 | 2/1965 | Fletcher et al. | 242—13 X |

FOREIGN PATENTS

| | | |
|---|---|---|
| 1,333,989 | 6/1963 | France. |

MERVIN STEIN, *Primary Examiner.*

B. S. TAYLOR, *Assistant Examiner.*